United States Patent Office 3,149,164
Patented Sept. 15, 1964

3,149,164
PROCESS FOR PREPARATION OF N,N-DIALKYL-VINYLAMINE
Warren J. Rabourn, Lake Jackson, Tex., assignor to The Dow Chemical Company, Midland, Mich., a corporation of Delaware
No Drawing. Filed June 5, 1961, Ser. No. 114,681
7 Claims. (Cl. 260—583)

This invention is related to the preparation of N,N-dialkylvinylamine and more particularly to an improvement in separation and stabilization of the product whereby high yields are obtained.

In the prior art, the preparation of dimethylvinylamine from several compounds is known, namely from neurine chloride, its corresponding hydroxide, and choline. This compound, according to literature sources, has also been prepared by the pyrolysis of the product mixture obtained in the reaction of acetaldehyde and dimethylamine. Other vinylamines have been prepared similarly. The former methods are disadvantageous because of expensive and difficultly obtainable materials and, as reported in the literature, poor yields of product. The latter pyrolysis method has also resulted in low yields of the desired product.

It has now been discovered that substantially quantitative yields of dimethylvinylamine and its N,N-dialkyl homologs can be obtained by heating the vapors of 1,1-bis(dialkylamino)ethane at about 100–400° C., condensing the product vapors and immediately cooling the condensate to a temperature below 0° C. in a vessel containing an inhibitor to prevent the recombination of the products to form the starting material and separating the mixture in the presence of the inhibitor to obtain the desired dialkylvinylamine.

The reaction can be represented as follows:

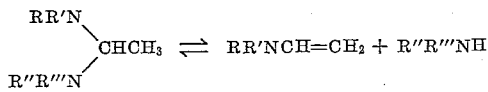

wherein R, R', R'' and R''' represent aliphatic hydrocarbon radicals.

The starting materials, 1,1-bis(dialkylamino)ethane, can be obtained in good yield by reacting dialkylamine with acetaldehyde at low temperature. Accordingly, acetaldehyde which has been cooled to about −80° is added to dialkylamine, which likewise has been cooled, in a dry ice-acetone bath at a rate so as to maintain the temperature below about −60°. After the addition is complete, anhydrous potassium carbonate is added, and the reaction mixture is allowed to warm slowly to room temperature. After about an hour, the aqueous phase is separated and discarded and KOH is added to the non-aqueous phase and stirring is continued for an hour. The product is filtered off from the KOH and distilled at reduced pressure in the presence of calcium hydride. The yield of 1,1-bis(dialkylamino)ethane is 80 to 90 percent or more based on starting materials. The reactants are used in about stoichiometric amounts, preferably with a slight excess of the dialkylamine.

The product so produced is then used in the process of the present invention. Thus, in a particular embodiment of the invention, 1,1-bis(dimethylamino)ethane is introduced dropwise at the upper end of an inclined glass tube containing a bed of powdered potassium carbonate which is maintained at a temperature of about 250° C. The vapors, which are purged from the tube by a continuous flow of fuel gas, or other inert gas, are condensed in a container which is kept at a temperature below 0° C. and which contains a small quantity of an inhibitor, for example sodium hydride, to stabilize the product mixture. The product mixture is then distilled in the presence of the inhibitor, preferably at reduced pressure, to remove the dimethylamine, after which the dimethylvinylamine may be distilled at atmospheric or reduced pressure. A small amount of the inhibitor should be added to the product to prevent polymerization and degradation.

The temperature of the cracking reaction should be about 100° to about 400° C. The cracking does not occur to any appreciable extent below about 100° C. In a reaction conducted at 80° the product mixture contained only about 3.5 volume-percent of the desired dimethylvinylamine and nearly 95 volume-percent of the starting material. Optimum conversions and yields are obtained at between about 250° and 300° C.; at 350° and above there is a noticeable decrease in the amount of dimethylvinylamine formed because of further cracking of the product. Tars and polymeric materials are also produced at temperatures above 350°.

The cracking reaction is primarily a thermal one and occurs to some extent when the 1,1-bis(dialkylamino)-ethane is passed through an empty glass tube at the appropriate temperatures, but conversion is less than when the tube is packed with a catalyst, or even an inert solid. The use of a catalyst is preferred since, with proper selection of a catalyst, the conversion of the starting material is considerably higher than when the reaction is run under the same conditions without it. Catalysts useful in the pyrolysis reaction include alkali metal carbonates and bicarbonates, alkaline earth metal oxides and phosphates, such as calcium and magnesium oxides and calcium and barium phosphates, and alumina. Other suitable catalysts can be selected from among the thermally stable neutral and basic salts of metals of Groups 1A, 1B, 2A, 2B and 3B of the Periodic Chart of the Elements. High conversions are necessary to make the process feasible commercially since difficulty is usually experienced in separating the dialkylvinylamine from the starting material.

The purge gas is optional, though advantageous, and is utilized primarily to exclude air and provide an inert atmosphere for the reaction. Any inert gas may be used for this purpose. Carbon dioxide is not inert, but nitrogen, helium, and hydrocarbon gases can be used.

The rate of introducing the reactant into the reaction zone can be varied widely, depending on the temperature, catalyst and reactant, but preferably is such that the conversion is high. Contact time in the reactor is short, being suitably in the range 1–60 sec.

The recombination reaction is inhibited by low temperature and the exclusion of moisture. This reaction is exothermic and occurs rapidly at room temperature, even in the absence of water. However, the mixture of pyrolysis products is quite stable at 0° C. and below. Acids catalyze the recombination of the pyrolysis products and must be rigorously excluded. Thus any material which will eliminate moisture and counteract acid is suitable for use as an inhibitor or stabilizer for the product mixture prior to its separation. Materials suitable as inhibitors are, for example, sodium hydride, lithium hydride, lithium aluminum hydride, and the like strongly basic materials. Sodium and potassium will not inhibit the reaction, probably because of their insolubility in the product mixture. The inhibitor suitably is used at the rate of about 0.1 to 1.0 percent by weight of product mixture.

After the dialkylamine has been separated, the further purification of the dialkylvinylamine may be accomplished by distillation at atmospheric or reduced pressure. The pure product is stable for short periods of time—a few hours—at room temperature without a stabilizer, but it is advisable to add a stabilizer if it is to be kept for any considerable length of time prior to use. The same materials which are inhibitors for the reaction of dialkylamine with dialkylvinylamine are also stabilizers for dialkylvinylamines. Other materials such as the alkali metals and the alkali metal oxides, acetylides, and amides and the like are useful as stabilizers.

The following examples are descriptive of my invention but the invention is not limited thereto.

EXAMPLE 1

Dimethylamine (360 g.) and acetaldehyde (176 g.) were cooled to about —80° C. and then the amine was added slowly to the aldehyde with stirring at a rate such that the temperature did not rise above —40°. After the addition was complete, anhydrous potassium carbonate (72 g.) was added to the mixture and the temperature permitted to rise slowly to that of the room, with continuous stirring. The mixture was stirred for 16 hours at room temperature. Next, the aqueous and organic phases were separated and the product (organic) phase was dried with KOH pellets (about 10 g.), filtered and then distilled over calcium hydride at 100 to 150 mm. Hg. pressure. A yield of 93 percent of the theoretical amount of 1,1-bis(dimethylamino)ethane was obtained.

This product was then used in the pyrolysis reaction to obtain dimethylvinylamine as shown in the following examples.

EXAMPLE 2

Into a pyrolysis tube maintained at 300° C. and containing 130 g. of $K_2CO_3$ in the heated zone was dropped 696 g. (6 moles) of 1,1-bis(dimethylamino)ethane at a rate of about 1 ml./min. The vapors were purged from the tube by dry fuel gas flowing at a rate of approximately 60 ml./min. This produced a contact time for the reactant of about 20 seconds. The vapors were collected in a receiver containing about one gram of sodium hydride (50 percent in mineral oil) and immersed in a Dry Ice-acetone bath. The pyrolysis required about 12 hours, after which the cold product mixture was distilled in the presence of one gram of sodium hydride, at 115 mm. Hg pressure, to remove the dimethylamine by-product. The conversion of the starting material was 93 percent, i.e., only 7 percent of the 1,1-bis(dimethylamino)ethane was recovered in the product mixture. The yield of dimethylvinylamine was 85.5 percent of the theoretical based on the conversion. The pure product had a boiling point of 55° C. at atmospheric pressure.

EXAMPLES 3 TO 9

The reaction of Example 2 was performed at various pyrolysis temperatures under the same conditions of introducing the reactant and flow of purge gas. Results are shown in Table I.

Table I

| Example No. | Reaction Temp. (° C.) | Contact Time (sec.) | Percent Conversion DMAE [1] | Percent Yield DMVA [2] |
| --- | --- | --- | --- | --- |
| 3 | 80 | 32 | 5 | 100 |
| 4 | 130 | 28 | 20 | 100 |
| 5 | 180 | 24 | 62 | 89 |
| 6 | 210 | 23 | 71 | 92 |
| 7 | 250 | 21 | 80 | 94 |
| 8 | 300 | 20 | 96 | 87 |
| 9 | 355 | 18 | 91 | 84 |

[1] DMAE—1,1-bis(dimethylamino)ethane.
[2] DMVA—dimethylvinylamine.

EXAMPLE 10

The reaction of Example 2 was repeated except that the $K_2CO_3$ was coated on 3/16" spheres of alumina (Norton Co. SA 203). The temperature of pyrolysis was maintained at 260°. The contact time under these conditions was about 22 seconds, the conversion of reactant was substantially complete and the yield of dimethylvinylamine was 81 percent of theory. A small amount of dimer of the vinylamine was formed also.

EXAMPLES 11 to 14

The reaction of Example 10 was repeated at 300° C. at different flow rates of the purge gas. The results are shown in Table II.

Table II

| Example No. | Contact Time (sec.) | Purge Gas Flow (ml./min.) | Percent Conversion DMAE | Percent Yield DMVA |
| --- | --- | --- | --- | --- |
| 11 | 19 | 68 | 97 | 82 |
| 12 | 14 | 140 | 88 | 85 |
| 13 | 10 | 260 | 88 | 85 |
| 14 | 8 | 370 | 72 | 80 |

EXAMPLES 15 TO 19

The reaction of Example 2 was performed using different catalysts, temperature of pyrolysis, and flow rates of purge gas and reactant. The results are shown in Table III.

Table III

| Example No. | Catalyst | Reaction Temp. (°C) | Contact Time (sec.) | Purge Gas Flow (ml./min.) | Percent Conv. DMAE | Percent Yield DMVA |
| --- | --- | --- | --- | --- | --- | --- |
| 15 | $K_2CO_3$ on Alumina | 280 | 11 | 70 | 85 | 82 |
| 16 | do | 280 | 6 | 70 | 72 | 82 |
| 17 | None | 280 | 20 | 70 | 47 | 94 |
| 18 | $NaHCO_3$ | 280 | 20 | 70 | 92 | 75 |
| 19 | $K_2CO_3$ | 300 | 17 | 100 | 98 | 78 |

When in the above examples 1,1-bis(dimethylamino)-ethane is replaced with other 1,1-bis(dialkylamino)-ethanes, the corresponding dialkylvinylamine is produced. Preferred materials are those in which the alkyl radicals contain up to about six carbon atoms each. Typical such compounds include 1,1-bis(diethylamino)ethane, 1,1-bis-(di-n-propylamino)ethane, 1,1-bis(di-sec.-amylamino)ethane, 1,1-bis(N-methyl-N-hexylamino)ethane, 1-(dimethylamino)-1-(diethylamino)ethane and in general, any 1,1-bis(dialkylamino)ethane in which the alkyl radicals contain up to about six carbon atoms and may be the same or different.

I claim:

1. The process for producing dialkylvinylamine comprising passing 1,1-bis(dialkylamino)ethane through a reaction zone maintained at a temperature of about 100° to 400° C., immediately passing the effluent from the reaction zone into a reciever zone maintained at a temperature below about 0° C. and separating dialkylvinylamine from the reaction product thus obtained.

2. The process defined in claim 1 wherein the reaction zone contains a catalyst which promotes the formation of dialkylvinylamine said catalyst being selected from the group consisting of alkali metal carbonates and bicarbonates and alumina.

3. The process defined in claim 1 wherein the 1,1-bis(dialkylamino)ethane is passed through the reaction zone concurrently with an inert diluent gas.

4. The process defined in claim 1 wherein said receiver zone contains an inhibitor for dialkylvinylamine said inhibitor being selected from the group consisting of alkali metal hydrides and alkali metal aluminum hydrides.

5. The process defined in claim 4 wherein the inhibitor is an alkali metal hydride.

6. The process defined in claim 1 wherein the 1,1-bis(dialkylamino)ethane is 1,1-bis(dimethylamino)ethane and the dialkylvinylamine is dimethylvinylamine.

7. The process for making dimethylvinylamine comprising passing a mixture of 1,1-bis(dimethylamino)ethane and an inert gas through a bed of potassium carbonate maintained at a temperature of about 100° to 400° C. at a rate to provide a contact time of about 1 to 60 seconds, condensing the effluent gases, cooling the condensate to a temperature below about 0° C. and adding to the condensate an inhibitor comprising an effective amount of an alkali metal hydride and removing the by-product dimethylamine from the condensate by distillation.

No references cited.